United States Patent
Moore

(10) Patent No.: US 11,151,199 B2
(45) Date of Patent: Oct. 19, 2021

(54) QUERY RESULT OVERLAP DETECTION USING UNIQUE IDENTIFIERS

(71) Applicant: EMC IP Holding Company LLC, Hopkinton, MA (US)

(72) Inventor: Scott Moore, Fredericksburg, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 367 days.

(21) Appl. No.: 16/241,448

(22) Filed: Jan. 7, 2019

(65) Prior Publication Data

US 2020/0218764 A1    Jul. 9, 2020

(51) Int. Cl.
*G06F 16/9038* (2019.01)
*G06F 16/13* (2019.01)
*G06F 16/908* (2019.01)
*G06F 16/903* (2019.01)

(52) U.S. Cl.
CPC ........ *G06F 16/9038* (2019.01); *G06F 16/134* (2019.01); *G06F 16/908* (2019.01); *G06F 16/90335* (2019.01)

(58) Field of Classification Search
CPC .. G06F 16/9038; G06F 16/134; G06F 16/908; G06F 16/90335; G06F 16/2471
See application file for complete search history.

(56) References Cited

U.S. PATENT DOCUMENTS

| | | | | |
|---|---|---|---|---|
| 7,778,997 B1* | 8/2010 | Chapman | ............ | G06F 16/2471 707/713 |
| 2002/0051020 A1* | 5/2002 | Ferrari | ................. | G06F 16/954 715/854 |
| 2004/0148326 A1* | 7/2004 | Nadgir | ................ | H04L 67/1057 709/200 |
| 2006/0031216 A1* | 2/2006 | Semple | .................... | G06F 16/71 |
| 2014/0250147 A1* | 9/2014 | Shapira | ............... | G06F 16/9558 707/770 |
| 2014/0280393 A1* | 9/2014 | Giampaolo | ........... | G06F 16/172 707/822 |
| 2015/0135275 A1* | 5/2015 | Matsugashita | ........ | H04L 63/104 726/4 |
| 2018/0081975 A1* | 3/2018 | DiTomaso | .......... | G06F 16/9038 |
| 2020/0021574 A1* | 1/2020 | Pinner | ................. | H04L 63/0853 |

OTHER PUBLICATIONS

Wikipedia, "Universally Unique Identifier," https://en.wikipedia.org/wiki/Universally_unique_identifier, Jan. 4, 2019, 9 pages.

* cited by examiner

*Primary Examiner* — Cam Y T Truong
(74) *Attorney, Agent, or Firm* — Ryan, Mason & Lewis, LLP

(57) ABSTRACT

A method in one embodiment comprises receiving at least one query from a client device, and distributing the at least one query to a plurality of query engines, wherein each of the plurality of query engines processes the at least one query and generates a partial query result. The plurality of query engines correspond to respective unique identifiers, and the partial query results each include the unique identifier of the query engine that generated the partial query result. The method also comprises determining whether the unique identifier of a given query engine is included with more than one partial query result generated in response to the at least one query, and identifying an error in response to an affirmative determination.

20 Claims, 5 Drawing Sheets

```
array<QueryResults> results = getResults(...);
// Array of query results from all devices set<string> uuids;
// list of sorted uuids from results used for overlap detection
for (oneResultSet in results)
// iterate over all result sets
{
    var uuid = getUUID(oneResultSet);
// Grab the UUID of the engine for this result set if (uuid in uuids)
// Is the UUID found in our UUID set of all results?
        {
            throw UUIDError(uuid);
// Throw an error indicating duplicate results found for uuid
        }
        else
        {
            uuids.add(uuid);
// No error, add uuid to our set for next pass (if any)
        }
}
```

QUERY RESULT OVERLAP DETECTION USING UNIQUE IDENTIFIERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to query processing in information processing systems.

BACKGROUND

A common technique among database technologies when handling database queries is to distribute queries across multiple devices. As a result, query processing can be more efficiently performed among multiple devices executing pieces of a query, so as not to unduly consume processing power on a single device. For example, when a client requests information from an enterprise in a query, the enterprise may use a first group of devices to distribute the query to a second group of devices, which each access different data to respond the query.

In order to distribute query processing to multiple devices, queries are sent to respective devices, which generate partial query results based on the data corresponding to each device. The partial results are aggregated to yield a final combined result that can be returned to a client. Difficulties arise when the same partial query results are separately aggregated by different devices, potentially providing erroneous final results to a client based on duplicate or overlapping data.

Accordingly, there is a need for an improved computer driven structure and process which is capable of preventing erroneous query results when using multiple devices in connection with query execution and processing.

SUMMARY

Illustrative embodiments in some implementations are configured to incorporate unique identifiers into query processing algorithms, for example, in order to detect misconfigurations in hierarchical topologies of query brokers and query engines. Multiple query engines having respective unique identifiers use different data to generate query results. The embodiments analyze the unique identifiers of the multiple query engines with respect to data flow paths of query results to a topmost query broker in order to identify duplicate data results.

In one embodiment, an apparatus comprises at least one processing platform including a plurality of processing devices. The processing platform is configured to receive at least one query from a client device, and to distribute the at least one query to a plurality of query engines, wherein each of the plurality of query engines processes the at least one query and generates a partial query result. The plurality of query engines correspond to respective unique identifiers, and the partial query results each include the unique identifier of the query engine that generated the partial query result. The processing platform is also configured to determine whether the unique identifier of a given query engine is included with more than one partial query result generated in response to the at least one query, and to identify an error in response to an affirmative determination.

These and other illustrative embodiments include, without limitation, apparatus, systems, methods and computer program products comprising processor-readable storage media.

BRIEF DESCRIPTION OF THE DRAWINGS

FIG. 5 shows example pseudocode for overlap detection in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
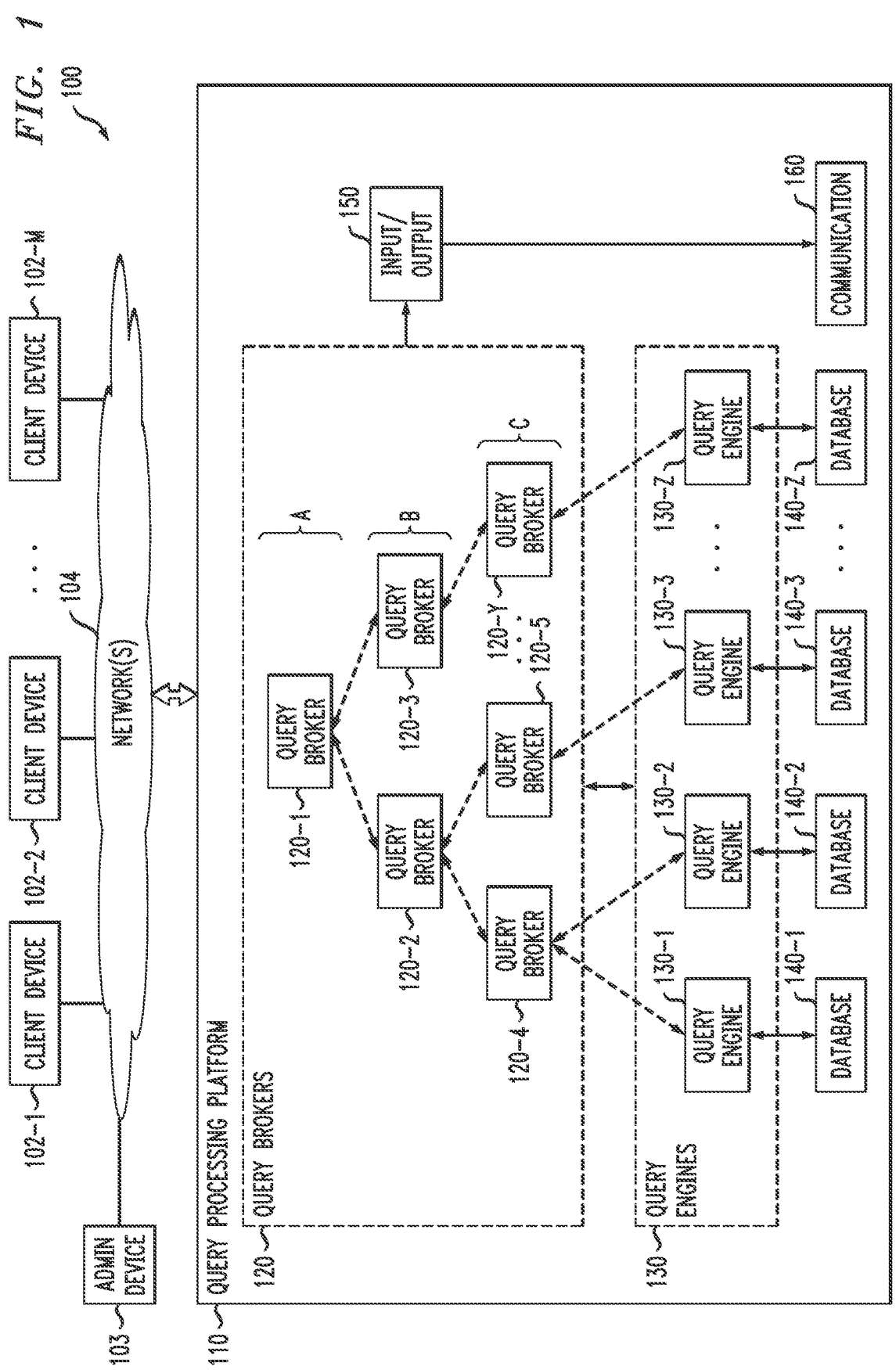
FIG. 1 is a block diagram of an information processing system comprising a query processing platform configured for detecting topology misconfigurations in query results in an illustrative embodiment.

FIG. 1 shows an information processing system 100 configured in accordance with an illustrative embodiment. The information processing system 100 comprises client devices 102-1, 102-2, . . . 102-M (collectively "client devices 102"). The information processing system 100 further comprises one or more administrator devices 103. The client devices 102 and administrator devices 103 communicate over a network 104 with a query processing platform 110.

The client devices 102 and administrator devices 103 can comprise, for example, desktop, laptop or tablet computers, mobile telephones, or other types of processing devices capable of communicating with the query processing platform 110 over the network 104. The variable M and other similar index variables herein such as K, L, Y and Z are assumed to be arbitrary positive integers greater than or equal to two.

The term "client," "user" or "administrator" herein is intended to be broadly construed so as to encompass numerous arrangements of human, hardware, software or firmware entities, as well as combinations of such entities. At least a portion of the available services and functionalities provided by the query processing platform 110 in some embodiments may be provided under Function-as-a-Service ("FaaS") and/or Platform-as-a-Service ("PaaS") models, including cloud-based FaaS and PaaS environments.

The query processing platform 110 in the present embodiment is assumed to be accessible to the client devices 102 and administrator devices 103 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The query processing platform 110, on behalf of respective infrastructure tenants each corresponding to one or more users associated with respective ones of the client devices 102 and one or more administrator devices 103, implements query brokers 120 and query engines 130 to provide clients and administrators with query processing services including, for example, responding to queries with results and providing analysis of a topology of the query brokers 120 and query engines 130 to identify any misconfigurations in the topology, which would lead to erroneous query results due to overlapping data. More specifically, according to illustrative embodiments, the query processing services include execution of an algorithm to detect overlapping leaf nodes in a topology tree of a plurality of query brokers 120-1, 120-2, 120-3, 120-4, 120-5 . . . 102-Y (collectively "query brokers 120") and a plurality of query engines 130-1, 130-2, 130-3, . . . 130-Z (collectively "query engines 130") based on unique identifiers, for example, universally unique identifiers (UUIDs), for each query broker 120 and each query engine 130. According to an embodiment, the infrastructure tenants are cloud infrastructure tenants.

Figure 3A:
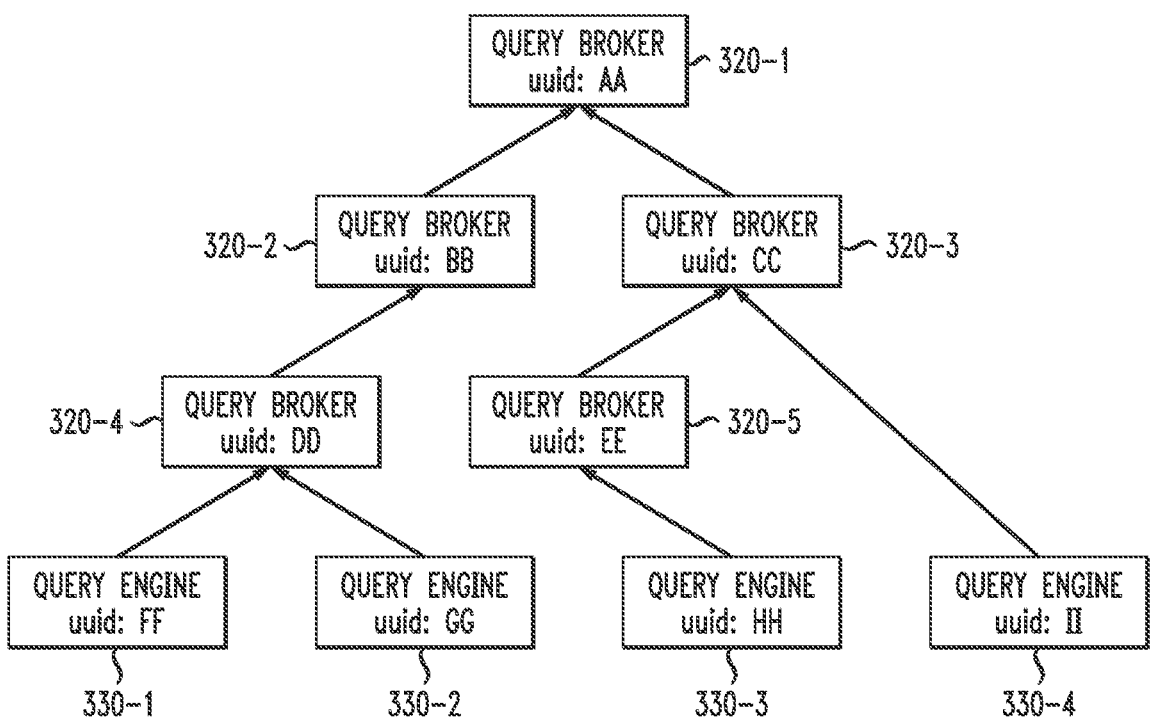
FIG. 3A is a block diagram illustrating data flows from query engines through query brokers where all paths indicate unique result sets in an illustrative embodiment.
Figure 3B:
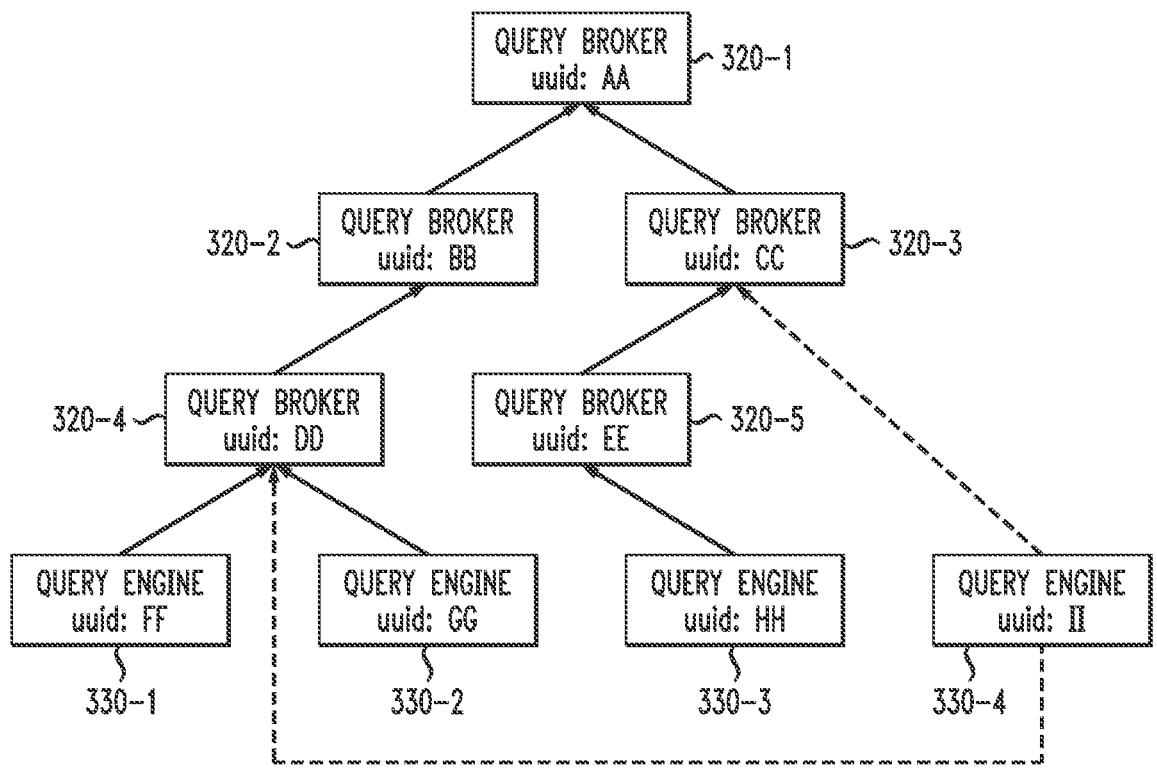
FIG. 3B is a block diagram illustrating data flows from query engines through query brokers where some paths indicate non-unique result sets in an illustrative embodiment.

FIG. 1 shows an example hierarchical topology of query brokers 120, with query broker 120-1 at a topmost level A of the topology, query brokers 120-2 and 120-3 at a next lower level B of the topology, and query brokers 120-4, 120-5, . . . 120-Y at a further lower level C of the topology. As can be seen by the dotted arrows, query brokers from upper levels distribute a query to query brokers at lower levels. FIG. 1 is an illustrative example of the connections between and the configuration of the query brokers 120 and query engines 130. The embodiments are not necessarily limited to what is shown in FIG. 1, and various other arrangements of query brokers and query engines 120 and 130 are contemplated, including, for example, different numbers of query brokers 120 and query engines 130, different numbers of levels, and different numbers of query brokers 120 in each level. FIG. 1 shows query brokers in level C connected to the query engines 130. However, it is also possible to have query brokers from upper levels directly connected to query engines as shown in FIGS. 3A and 3B described further herein.

According to the topology in FIG. 1, an incoming query from a client device 102 can be received by the topmost query broker 120-1 and distributed to query brokers in lower levels, and then to the query engines 130 to respectively process the query based on different types of data. Alternatively, depending on the nature of the query, the query may bypass the topmost query broker 120-1, or, in general, query brokers at higher levels, and is received directly by query brokers at lower levels in the topology for distribution to other query brokers 120 and/or query engines 130.

Figure 2:
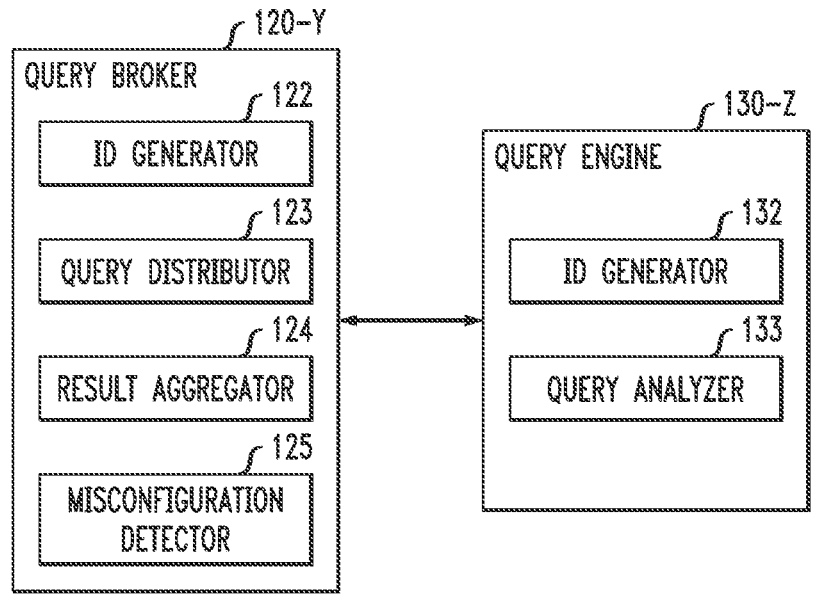
FIG. 2 is a block diagram illustrating a query broker and a query engine in an illustrative embodiment.

Referring to FIG. 2, in illustrative embodiments, any given query broker 120-Y and any given query engine 130-Z includes a unique identification generator 122 and 132 configured to generate, upon initial execution, a UUID, which is not changed until the given query broker 120-Y or the given query engine 130-Z goes out of commission (e.g., hardware is retired, virtual machine (VM) is permanently erased, etc.). A UUID is unique when created and, when generated using, for example, high fidelity timestamps and other unique bits associated with the given query broker 120-Y or the given query engine 130-Z, such as, for example, a media access control address (MAC address), the UUID will not again be exactly generated. The identification generators 122 and 132 are configured to generate non-duplicative UUIDs with respect to UUIDs generated by other query brokers and query engines. Each query broker 120 and query engine 130 in a topology of query brokers 120 and query engines 130 is referred to by its unique identifier (e.g., UUID).

Each query broker 120, including a topmost query broker 120-1 in a hierarchical topology, receives one or more query results from connected query brokers 120 and query engines 130 in the topology. The query results include the unique identifiers (e.g., UUIDs) of each of the query brokers 120 and query engines 130 used in connection with distribution and processing of a given query from any one of the client devices 120. The unique identifiers (e.g., UUIDs) are used to detect topology misconfigurations that can lead to erroneous results.

According to some embodiments, one or more query brokers 120 delegate a submitted query from a client device 102 through a given topology to one or more query brokers 120, which eventually submit the query to one or more query engines 130. Referring to FIG. 2, any given query engine 130-Z includes a query analyzer 133 generating a result in response to the submitted query. The query result is returned from the query engine 130 to the first query broker 120 that received the query from the client device 102. The query result is returned from the query engine 130 through the same path including each of the query brokers 120 through which the query request flowed to the query engine 130. The query result is tagged with each UUID (e.g., as metadata) corresponding to each query broker and query engine in the path back to the originating query broker 120, prepending the UUID of each query broker and query engine in a workflow path to the workflow path.

Referring to FIG. 3A, an example topology shows a hierarchical structure of query brokers 320-1, 320-2, 320-3, 320-4 and 320-5 (collectively "query brokers 320") having respective UUIDs AA, BB, CC, DD and EE. The topmost query broker 320-1 has UUID AA. The arrows in FIG. 3A indicate data flows from query engines 330-1, 330-2, 330-3 and 330-4 (collectively "query engines 330") through query brokers 320, where all paths indicate unique result sets. For example, query results from query engine 330-1 include a UUID path of /AA/BB/DD/FF, query results from query engine 330-2 include a UUID path of /AA/BB/DD/GG, query results from query engine 330-3 include a UUID path of /AA/CC/EE/HH, and query results from query engine 330-4 include a UUID path of /AA/CC/II. All paths indicate result sets from different query engines in each respective path, where the same query engine does not appear in more than one path.

According to illustrative embodiments, when clients submit a query to an enterprise, generating a response to the query may require accessing different data, which, for various reasons explained herein, is handled through different query engines 130/330. For example, referring to FIG. 1, respective query engines 130-1, 130-2, 130-3, . . . 130-Z are linked to respective databases 140-1, 140-2, 140-3, . . . 140-Z (collectively "databases 140") each having different types of data. In a non-limiting example, for purposes of explanation, the different databases may correspond to data from different regions such as, for example, North America, South America, Europe and Asia. For example, a client may request worldwide sales data for the past week, in which case, the topmost query broker 120-1/320-1 distributes the incoming query to the different query brokers connected to the query engines that can access databases including regional sales data from North America, South America, Europe and Asia. Once the query engines (e.g., query engines 130/330) receive the query from the query brokers (e.g., query brokers 120/320) in their respective paths from the topmost query broker, the query engines generate respective query results in response to the query based on their corresponding portions of data. For example, query engines 130-1, 130-2, 130-3, . . . 130-Z respectively linked to databases 140-1, 140-2, 140-3, . . . 140-Z may generate query results with sales data from North America, South America, Europe and Asia, respectively.

As can be seen in FIG. 3A, the arrows indicate data flow paths from query engines 330 through query brokers 320, where all paths indicate unique result sets. In other words, in FIG. 3A, each data flow path is unique to a particular query engine so that no two data flow paths originate from the same query engine. For example, data flow paths /AA/BB/DD/FF, /AA/BB/DD/GG, /AA/CC/EE/HH and /AA/CC/II back to the topmost query broker 320-1 each originate from a different query engine 330-1, 330-2, 330-3, 330-4 having UUIDs FF, GG, HH and II, respectively. The data flow paths identify the flow of returned data within the topology of query brokers and query engines. The data flow paths identify the flow of returned data by using unique identifiers (e.g., UUIDs) included with the query results as, for example, metadata tags. Within each path, the origination of the data (e.g., the query engine that responded to the query) forms the trailing UUID or leaf node of this path. In the case of FIG. 3A, there is no unwanted overlap of data by more than one data flow path originating from the same query engine.

Overlap of data by more than one data flow path originating from the same query engine could lead to erroneous results. For example, referring to FIG. 3B, some data flow paths indicate non-unique result sets in an illustrative embodiment. As shown by the dotted arrows in FIG. 3B, each data flow path is not unique to a particular query engine. In the example embodiment in FIG. 3B, more than one data flow path (e.g., two in this example) originates from the same query engine 320-4. For example, data flow paths /AA/CC/II and /AA/BB/DD/II back to the topmost query broker 320-1 each originate from query engine 330-4 having UUID II. Similar to FIG. 3A, data flow paths /AA/BB/DD/FF, /AA/BB/DD/GG, /AA/CC/EE/HH back to the topmost query broker 320-1 each originate from a different query engine 330-1, 330-2 and 330-3.

Referring to FIG. 2, any given query broker 120-Y includes a query distributor 123, a result aggregator 124 and a misconfiguration detector 125. The misconfiguration detector 125 analyzes data included with the query results to detect whether more than one data flow path originates from the same query engine, indicating a topology misconfiguration. The topology misconfiguration incorrectly causes two or more query brokers to receive query results originating from the same query engine along two different paths. By some topology configuration error caused, for example, during setting up of a topology, two or more query brokers may distribute a query to the same query engine, causing the same data to be processed twice and wrongly included in responses to different portions of the query. The configuration error may be caused by, for example, one or more administrators who set up the topology of query brokers and query engines.

Using their respective misconfiguration detectors 125, the detection of a misconfiguration is performed by every query broker 120/320, at the point where all result sets have been returned by the query broker's immediate children, which can be other query broker or query engines. The misconfiguration detectors 125 examine all result set paths to determine whether any unique identifier (e.g., UUID) of any one query engine leaf node in the topology appears more than once. If any unique identifier (e.g., UUID) of any one query engine leaf node in the topology appears more than once in respective result set paths, then a determination is made by the misconfiguration detector 125 that the query results are not trustworthy and may include errors due to, for example, duplicate data analysis. If a misconfiguration is detected, then various actions are taken, but are not necessarily limited to: (i) transmitting an alert from the query processing platform 110 to one or more administrator devices 103 to inform one or more administrators of the topology misconfiguration; (ii) transmitting a query result set from the query processing platform 110 to one or more of the client devices 102, with an informational message that there is an issue with the data leading to erroneous results; and/or (iii) rejecting the query results due to the topology misconfiguration error, and transmitting from the query processing platform 110 to one or more of the client devices 102 an informational message that there is an issue with the data.

Referring to FIG. 2, the result aggregator 124 in any given query broker 120-Y merges and organizes the query results from connected query brokers and/or query engines below the given query broker 120-Y in the hierarchical topology. For example, in FIG. 3A, the result aggregator of query broker 320-4 aggregates the query results from query engines 330-1 and 330-2, the result aggregator of query broker 320-3 aggregates the query results from query broker 320-5, which includes the results from query engine 330-3, and from query engine 330-4, and the result aggregator of query broker 320-1 aggregates the query results from query broker 320-2 and from query broker 320-3. In the regional example herein, assuming query engines 330-1, 330-2, 330-3 and 330-4 respectively correspond to data from North America, South America, Europe and Asia, respectively, the top most query broker 320-1 receives aggregated results in connection with North and South American data from query broker 320-2, and aggregated results from Europe and Asia from query broker 320-3, and further aggregates those results into a final combined result to be presented to one or more clients via one or more client devices (e.g., client devices 102).

In FIG. 3B, the result aggregator of query broker 320-4 aggregates the query results from query engines 330-1, 330-2 and 330-4, the result aggregator of query broker 320-3 aggregates the query results from query broker 320-5, which includes the results from query engine 330-3, and from query engine 330-4, and the result aggregator of query broker 320-1 aggregates the query results from query broker 320-2 and from query broker 320-3. In analyzing the results from query broker 320-2 and from query broker 320-3, the misconfiguration detector query broker 320-1 identifies that query results from query engine 330-4 appear in respective result paths /AA/BB/DD/II and /AA/CC/II, which means that the query results from query engine 330-4 are aggregated through a result path including query brokers 320-1, 320-2 and 320-4, and another result path including query broker 320-1 and 320-3, leading to erroneous results due to overlapping data. In the regional example herein, the top most query broker 320-1 erroneously receives aggregated results in connection with Asia more than once. Although described in connection with two respective return paths including the same originating query engine, the embodiments are not necessarily limited thereto, and the number of respective return paths including the same originating query engine may also be more than two in order to identify an error.

The query distributor 123 of any given query broker 120-Y is configured to distribute an incoming query to those lower query brokers and/or query engines connected to the given query broker 120-Y in the hierarchical topology. For example, referring to FIG. 3A, the query distributor of query broker 320-1 distributes a query to query brokers 320-2 and 320-3, the query distributor of query broker 320-2 further distributes the query to query broker 320-4, the query distributor of query broker 320-3 further distributes the query to query broker 320-5 and query engine 330-4, the query distributor of query broker 320-4 further distributes the query to query engines 330-1 and 330-2, and the query distributor of query broker 320-5 further distributes the query to query engine 330-3. FIG. 3B, has a similar distribution scheme to that in FIG. 3A, except that query broker 320-4 and query broker 320-3 both distribute the query to query engine 330-4, which is a misconfiguration, such that at least one of query broker 320-3 and query broker 320-4 should not be configured to distribute a query to query engine 330-4.

Referring to FIG. 1, final aggregated query results and/or error messages are received by an input/output component 150 and transmitted from the query processing platform 110 to the client and/or administrator devices 102 and 103 via communication component 160 and network(s) 104. The communication component 160 includes, for example, appropriate interfaces, for example, application programming interfaces (APIs) for transmitting and receiving data to and from client and/or administrative devices 102 and 103, or other connected devices over the network(s) 104.

The query processing platform 110 in some embodiments may be implemented as part of a cloud infrastructure in the form of a cloud-based system such as an AWS system. Other examples of cloud-based systems that can be used to provide at least portions of the query processing platform 110 and possibly other portions of system 100 include GCE, and Microsoft Azure®.

FIG. 5 shows example pseudocode 500 for overlap detection in an illustrative embodiment. According to the pseudocode 500, at a given query broker 120-Y, result set paths are examined to determine whether any UUID of any one query engine in the topology appears more than once. If any UUID of any one query engine appears more than once in respective result set paths received by the given query broker 120-Y, then an error indicating duplicate results is generated. If no error is detected, the UUID of the given query broker 120-Y is added to the query result set for subsequent analysis by other query brokers, if any, positioned higher in the topology.

The query brokers 120, query engines 130 and other components of the query processing platform 110 comprise further hardware and software required for running the query processing platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases or cloud environments discussed herein (e.g., databases 140) may comprise a database service, such as, but not necessarily limited to GCE Cloud Storage, Microsoft Azure Blob (Binary Large Object) Storage, DynamoDB, MongoDB, Amazon Aurora and Oracle database.

Although the query brokers 120, query engines 130 and other components of the query processing platform 110 in the present embodiment are shown as part of the query processing platform 110, at least a portion of the query brokers 120, query engines 130 and other components of the query processing platform 110 in other embodiments may be implemented on one or more other processing platforms that are accessible to the query processing platform 110 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the query processing platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of query processing platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the query processing platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs. As used herein, a query broker 120/320 or query engine 130/330 includes at least one processing device.

The term "processing platform" as used herein is intended to be broadly construed so as to encompass, by way of illustration and without limitation, multiple sets of processing devices and one or more associated storage systems that are configured to communicate over one or more networks.

As a more particular example, query brokers 120, query engines 130 and other components of the query processing platform 110, and the elements thereof can each be implemented in the form of one or more LXCs running on one or more VMs. Other arrangements of one or more processing devices of a processing platform can be used to implement query brokers 120, query engines 130, as well as other components of the query processing platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the query processing platform 110 to reside in different data centers. Numerous other distributed implementations of the query processing platform 110 are possible.

Accordingly, one or each of the query brokers 120, query engines 130 and other components of the query processing platform 110 can each be implemented in a distributed manner so as to comprise a plurality of distributed components implemented on respective ones of a plurality of compute nodes of the query processing platform 110.

It is to be appreciated that these and other features of illustrative embodiments are presented by way of example only, and should not be construed as limiting in any way.

Accordingly, different numbers, types and arrangements of system components such as the query brokers 120, query engines 130 and other components of the query processing platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the query processing platform can be offered to cloud infrastructure customers or other users as part of FaaS and/or PaaS offerings.

The operation of the information processing system 100 will now be described in further detail with reference to the flow diagram of FIG. 4.

Figure 4:
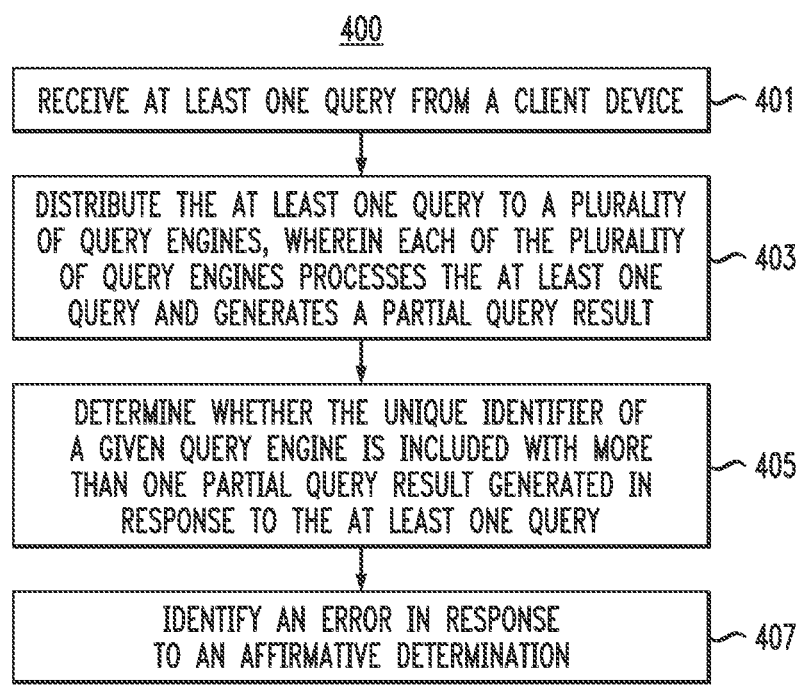
FIG. 4 is a flow diagram of a process for detecting topology misconfigurations in query results in an illustrative embodiment.

FIG. 4 is a flow diagram of a process for detecting topology misconfigurations in query results in an illustrative embodiment. With reference to FIG. 4, the process 400 as shown includes blocks 401, 403, 405 and 407, and is suitable for use in the system 100 but is more generally applicable to other types of information processing systems comprising a query processing platform configured for detecting topology misconfigurations in query results.

At blocks 401 and 403, at least one query is received from a client device, and the query is distributed to a plurality of query engines. The query engines each process the query and generate a partial query result. The partial query results from the query engines are aggregated into a combined query result, and the combined query result is transmitted to the client device. The query engines each process the query using different data from each other.

Each of the query engines corresponds to a unique identifier, such as, for example, a UUID. Each partial query result includes the unique identifier of the query engine that generated the partial query result. At block 405, the process 400 further includes determining whether the unique identifier of a given query engine is included with more than one partial query result generated in response to the query. At block 407, an error is identified in response to an affirmative determination. An error message can be to the client device and/or to an administrator device in response to the identification of an error.

The query is also distributed to a plurality of query brokers organized in a hierarchical topology. Each of the query brokers also correspond to a unique identifier, such as a UUID. The query is further distributed from the plurality of the query brokers to the plurality of query engines. The partial query results from the plurality of query engines are returned to given ones of the plurality of query brokers from which the query was distributed. In addition, a plurality of partial query results received from respective ones of the plurality of query engines are aggregated at one or more of the plurality of query brokers.

In the process, the determination of whether the unique identifier of a given query engine is included with more than one partial query result is performed at each of the plurality of query brokers.

Distribution of the query from at least one query broker to a query engine proceeds along at least one distribution path, and returning of a partial query result from the query engine to the at least one query broker proceeds along at least one return path. The at least one distribution path and the at least one return path include the same query brokers and query engines, and the partial query result includes the unique identifiers of the query brokers and query engines in the at least one distribution path and the at least one return path.

It is to be appreciated that the FIG. 4 process and other features and functionality described above can be adapted for use with other types of information systems configured to execute topology misconfiguration detection services on a query processing platform or other type of processing platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process blocks may be varied in other embodiments, or certain blocks may be performed at least in part concurrently with one another rather than serially. Also, one or more of the process blocks may be repeated periodically, or multiple instances of the process can be performed in parallel with one another.

Functionality such as that described in conjunction with the flow diagrams of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

In accordance with one or more embodiments, each of the query engines 130/330 parse part of the whole data, thus allowing massive data lakes to be broken into manageable pieces to improve processing efficiency. The query brokers 120/320 and query engines 130/330 form a topology of data retrieval that presents a unified result set to clients. The embodiments advantageously detect misconfigurations in the topology that could potentially provide erroneous results to a client when the same query engine is accidentally configured to be used more than once when responding to a query.

Illustrative embodiments of systems with the query processing platform as disclosed herein can provide a number of significant advantages relative to conventional arrangements. For example, one or more embodiments are configured to address problems with current approaches for query processing which are not able to detect data overlaps leading to erroneous results. Advantageously, the illustrative embodiments incorporate unique identifiers into algorithms for detecting misconfigurations in hierarchical topologies of query brokers and query engines by analyzing UUIDs in data flow paths from originating query engines to a topmost query broker. As an advantage, illustrative embodiments provide for efficiency in query processing by spreading query functions among multiple devices, while also providing an efficient technique for discovering duplicate data results based on device identifiers of the multiple devices generating the query results.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the query processing platform 110 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and a query processing platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
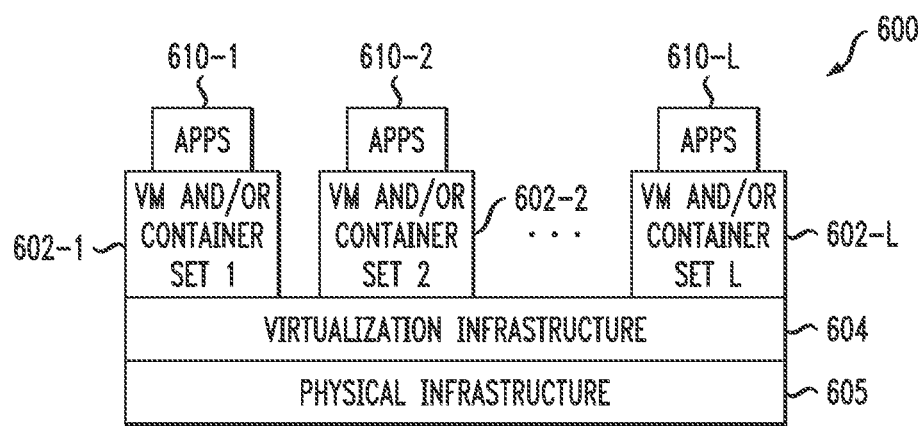
FIGS. 6 and 7 show examples of processing platforms that may be utilized to implement at least a portion of an information processing system in illustrative embodiments.
Figure 7:
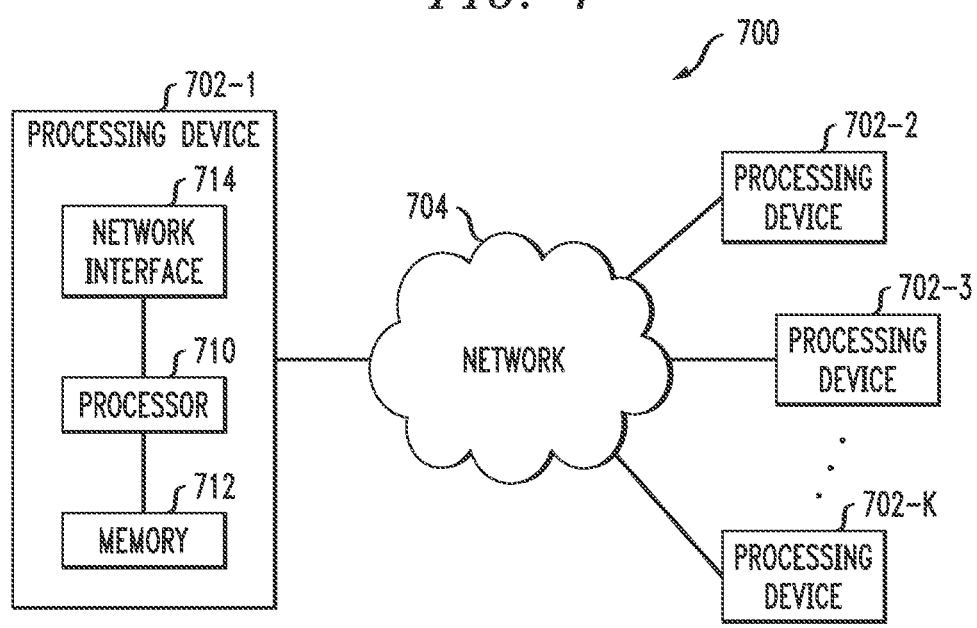

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide query processing functionality of the type described above for one or more processes running on a given one of the VMs. For example, each of the VMs can implement topology misconfiguration detection for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide query processing functionality of the type described above for one or more processes running on different ones of the containers. For example, a container host device supporting multiple containers of one or more container sets can implement one or more instances of topology misconfiguration detection.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the query processing platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and query processing platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing platform comprising at least one processing device comprising a processor coupled to a memory;
    said at least one processing platform being configured:
    to receive at least one query from a client device via a network;
    to distribute via the network the at least one query to a plurality of query brokers;
    to distribute the at least one query from the plurality of the query brokers to a plurality of query engines, wherein each query engine of the plurality of query engines processes the at least one query and generates a partial query result;
    wherein the plurality of query engines and the plurality of query brokers correspond to respective unique identifiers;
    to receive the partial query results from the plurality of query engines over a plurality of return paths, each return path of the plurality of return paths comprising one or more of the plurality of the query brokers and a query engine of the plurality of query engines that generated the partial query result;
    wherein each partial query result of the partial query results includes a plurality of unique identifiers respectively corresponding to the query engine that generated the partial query result and to the one or more query brokers in a corresponding return path of the plurality of return paths, the plurality of unique identifiers being included with the partial query result as metadata;
    to determine whether a unique identifier of a given query engine is included as metadata with more than one partial query result generated in response to the at least one query;
    wherein, in the determining, said at least one processing platform is configured to identify matching ones of the plurality of unique identifiers corresponding to query engines that generated the partial query results in respective ones of the plurality of return paths; and
    to identify an error in the partial query results in response to an affirmative determination;
    wherein said at least one processing platform is further configured to transmit an error message to at least one device in response to an identification of the error.

2. The apparatus of claim 1 wherein each unique identifier of the unique identifiers comprises a universally unique identifier (UUID).

3. The apparatus of claim 1 wherein the determination of whether the unique identifier of a given query engine is included as metadata, with more than one partial query result, is performed at each query broker of the plurality of query brokers in the plurality of return paths.

4. The apparatus of claim 1 wherein the plurality of query brokers are organized in a hierarchical topology.

5. The apparatus of claim 1 wherein said at least one processing platform is further configured to aggregate a plurality of partial query results at one or more of the plurality of query brokers.

6. The apparatus of claim 1 wherein said at least one processing platform is further configured to return the partial query results from the plurality of query engines to given ones of the plurality of query brokers from which the at least one query was distributed.

7. The apparatus of claim 1 wherein distribution of the at least one query from at least one query broker of the plurality of the query brokers to a query engine of the plurality of query engines proceeds along at least one distribution path.

8. The apparatus of claim 7 wherein returning of a partial query result from the query engine to the at least one query broker proceeds along at least one return path of the plurality of return paths, wherein the at least one distribution path and the at least one return path include the same query brokers and query engines.

9. The apparatus of claim 8 wherein the partial query result includes the unique identifiers of the query brokers and query engines in the at least one distribution path and the at least one return path.

10. The apparatus of claim 1 wherein said at least one processing platform is further configured:
    to aggregate the partial query results from the plurality of query engines into a combined query result; and
    to transmit the combined query result to the client device.

11. The apparatus of claim 10 wherein the at least one device comprises the client device.

12. The apparatus of claim 10 wherein the at least one device comprises an administrator device.

13. The apparatus of claim 1 wherein each query engine of the plurality of query engines processes the at least one query using different data from each other.

14. A method comprising:
    receiving, by at least one processing platform comprising at least one processing device that comprises a processor coupled to a memory, at least one query from a client device via a network;
    distributing, by the at least one processing platform via the network, the at least one query to a plurality of query brokers;
    distributing, by the at least one processing platform, the at least one query from the plurality of the query brokers to a plurality of query engines, wherein each query engine of the plurality of query engines processes the at least one query and generates a partial query result;
    wherein the plurality of query engines and the plurality of query brokers correspond to respective unique identifiers;
    receiving the partial query results from the plurality of query engines over a plurality of return paths, each return path of the plurality of return paths comprising one or more of the plurality of the query brokers and a query engine of the plurality of query engines that generated the partial query result;
    wherein each partial query result of the partial query results includes a plurality of unique identifiers respectively corresponding to the query engine that generated the partial query result and to the one or more query brokers in a corresponding return path of the plurality of return paths, the plurality of unique identifiers being included with the partial query result as metadata;
    determining, by the at least one processing platform, whether a unique identifier of a given query engine is included as metadata with more than one partial query result generated in response to the at least one query;
    wherein the determining comprises identifying matching ones of the plurality of unique identifiers corresponding to query engines that generated the partial query results in respective ones of the plurality of return paths;

identifying an error in the partial query results in response to an affirmative determination; and transmitting, by the at least one processing platform, an error message to at least one device in response to an identification of the error.

15. The method of claim 14 wherein the determination of whether the unique identifier of a given query engine is included as metadata, with more than one partial query result, is performed at each query broker of the plurality of query brokers in the plurality of return paths.

16. A computer program product comprising a non-transitory processor-readable storage medium having stored therein program code of one or more software programs, wherein the program code when executed by at least one processing platform causes said at least one processing platform:

to receive at least one query from a client device via a network;

to distribute via the network the at least one query to a plurality of query brokers;

to distribute the at least one query from the plurality of the query brokers to a plurality of query engines, wherein each query engine of the plurality of query engines processes the at least one query and generates a partial query result;

wherein the plurality of query engines and the plurality of query brokers correspond to respective unique identifiers;

to receive the partial query results from the plurality of query engines over a plurality of return paths, each return path of the plurality of return paths comprising one or more of the plurality of the query brokers and a query engine of the plurality of query engines that generated the partial query result;

wherein each partial query result of the partial query results includes a plurality of unique identifiers respectively corresponding to the query engine that generated the partial query result and to the one or more query brokers in a corresponding return path of the plurality of return paths, the plurality of unique identifiers being included with the partial query result as metadata;

to determine whether a unique identifier of a given query engine is included as metadata with more than one partial query result generated in response to the at least one query;

wherein, in the determining, said at least one processing platform is configured to identify matching ones of the plurality of unique identifiers corresponding to query engines that generated the partial query results in respective ones of the plurality of return paths;

to identify an error in the partial query results in response to an affirmative determination; and to transmit an error message to at least one device in response to an identification of the error.

17. The computer program product of claim 16 wherein the determination of whether the unique identifier of a given query engine is included as metadata, with more than one partial query result, is performed at each query broker of the plurality of query brokers in the plurality of return paths.

18. The computer program product of claim 16 wherein the plurality of query brokers are organized in a hierarchical topology.

19. The computer program product of claim 16 wherein the program code further causes said at least one processing platform to aggregate a plurality of partial query results at one or more of the plurality of query brokers.

20. The computer program product of claim 16 wherein the program code further causes said at least one processing platform to return the partial query results from the plurality of query engines to given ones of the plurality of query brokers from which the at least one query was distributed.

* * * * *